United States Patent [19]

Middleton

[11] 3,888,924
[45] June 10, 1975

[54] BIS(DIALKYLAMINO)SULFUR DIFLUORIDES

[75] Inventor: William Joseph Middleton, Chadds Ford, Pa.

[73] Assignee: E. I. Du Pont De Nemours & Company, Wilmington, Del.

[22] Filed: Mar. 23, 1973

[21] Appl. No.: 344,168

[52] U.S. Cl.... 260/543 F; 260/293.63; 260/293.85; 260/326.82; 260/850 F; 260/653.3; 260/666 A; 260/648 F
[51] Int. Cl. .................. C07d 29/34; C07d 27/02; C07c 145/00
[58] Field of Search ...... 260/543 F, 293.85, 326.82, 260/326.9

[56] References Cited
OTHER PUBLICATIONS

Nöth et al., Berichte (97) 1, pp. 202–206 (1964).
Lustig et al., Inorganic Chem. Vol. 4, No. 10 (1965) pp. 1444–1446.
Lawless Inorg. Chem. 1970 9 (12) 2796–2798. C.A. Vol. 74, 12545 — abstract only furnished.
Shreeve et al., J. Chem. Soc. D. 1970 (24) 1679–1680, abstract only — C.A. 74: 52974.

Primary Examiner—Lorraine A. Weinberger
Assistant Examiner—Richard D. Kelly

[57] ABSTRACT

Bis(dialkylamino)sulfur difluorides are new fluorinating agents.

4 Claims, No Drawings

BIS(DIALKYLAMINO)SULFUR DIFLUORIDES

BACKGROUND OF THE INVENTION

1. Field of the Invention

This invention relates to new bis(dialkylamino)-sulfur difluoride compounds which are useful as fluorinating agents.

2. Prior Art

The preparation of dialkylamino sulfur trifluorides is described by G. C. Demitras, R. A. Kent and A. C. MacDiarmid, Chem. Ind. (London), 1964, 1712; and by G. C. Demitras and A. G. MacDiarmid, Inorg. Chem., 6, 1903 (1967). The $^{19}$F nmr spectrum was described.

S. P. Von Halasz and O. Glemser, Chem. Ber., 103, 594 (1970) describe the preparation of $(C_2H_5)_2NSF_3$ by reaction of $(C_2H_5)_2NSi(CH_3)_3$ with $SF_4$. This compound reacts with $(CH_3)_3Si-N=C=N-Si(CH_3)_3$ to give $NCN=SFN(C_2H_5)_2$. No other chemistry is reported.

S. P. Von Halasz and O. Glemser, Chem. Ber., 104, 1247 (1971) describe the preparation of $RSF_3$ (R = $Me_2N$, $Et_2N$ and piperidino) by the reaction of R—Si(CH$_3$)$_3$ with $SF_4$. They report several reactions of $RSF_3$ compounds, including:

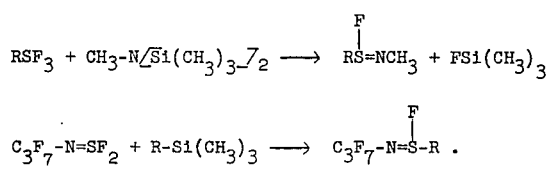

W. C. Smith, Angew. Chem., 74, 742 (1962) review the use of $SF_4$ as a fluorinating agent.

W. A. Sheppard, J. Amer. Chem. Soc., 82, 4751 (1960); 84, 3058 (1962) describe the use of phenylsulfur trifluoride to fluorinate carbonyl compounds.

W. C. Smith, U.S. Pat. No. 2,859,245 and Schneider et al. U.S. Pat. No. 2,983,626 disclose the process of preparing organic fluorine compounds by the reaction of $SF_4$ with carbonyl compounds.

DESCRIPTION OF THE INVENTION

The invention is a new fluorinating agent of the formula

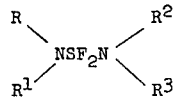

in which R, R$^1$, R$^2$ and R$^3$, alike or different, are primary alkyl groups of 1 to 6 carbon atoms and R and R$^1$ when taken together, and R$^2$ and R$^3$ when taken together, can be —(CH$_2$)$_4$— or —(CH$_2$)$_5$—.

The bis(dialkylamino)sulfur difluorides of this invention are prepared by the reaction of at least one equivalent of a dialkylaminosulfur trifluoride with up to one equivalent of a dialkylaminotrimethylsilane under substantially anhydrous conditions. For maximum yields, one equivalent of each reagent is used.

The reaction is conducted by charging the dialkylaminosulfur trifluoride into the reaction vessel and then adding the aminosilane. Solvent is not necessary for the reaction but the use of an inert solvent is usually advantageous to moderate the reaction and to insure better mixing. Solvents suitable for the reaction include hydrocarbons such as pentane and benzene, halocarbons such as trichlorofluoromethane, methylene chloride, chloroform, and carbon tetrachloride, and ethers such as diethyl ether and tetrahydrofuran, or any other solvent inert to both reactants.

The reaction is conducted at a temperature of −80°C. to +50°C. The preferred range is 0°–30°.

Pressure is not critical. Ambient and/or autogenous pressure is the most convenient and therefore preferred.

The bis(dialkylamino)sulfur difluorides can be separated from the reaction mixture and purified by the usual techniques such as crystallization, filtration, and distillation. The new difluorides are not stable for prolonged times at temperatures in excess of 100°C. and purification techniques involving temperatures higher than 100° are not recommended.

SPECIFIC EMBODIMENTS OF THE INVENTION

In the following illustrative examples all parts are by weight and all temperatures are in degrees Centigrade unless otherwise stated.

EXAMPLE 1

Bis(dimethylamino)sulfur Difluoride

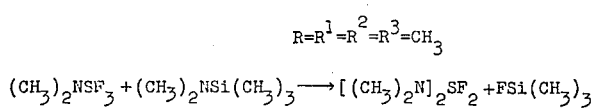

A 29.25-g (0.25 mole) sample of dimethylaminotrimethylsilane was added dropwise to a solution of 33.2 g (0.25 mole) of dimethylaminosulfur trifluoride in 100 ml CCl$_3$F cooled to −78°. The reaction mixture was warmed to 25° and then filtered under nitrogen to remove a small amount of suspended solid. The filtrate was evaporated to dryness under reduced pressure to give 23.54 g (60 percent) of bis(dimethylamino)sulfur difluoride as a white crystalline solid: mp 64°–65.5°; $^{19}$F nmr (CCl$_3$F) δ +6.9 ppm (s); $^1$H nmr (CCl$_3$F) δ 2.80 ppm (s).

Anal. Calcd for C$_4$H$_{12}$F$_2$N$_2$S: C, 30.37; H, 7.65; F, 24.02; N, 17.71; S, 20.26
Found: C, 30.53; N, 7.91; F, 24.12; N, 16.13; S, 19.70

EXAMPLE 2

Bis(diethylamino)sulfur Difluoride

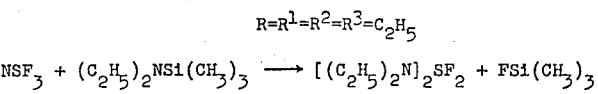

A 14.5-g (0.1 mole) sample of diethylaminotrimethylsilane was added dropwise to a stirred solution of 16.1 g (0.1 mole) of diethylaminosulfur trifluoride in 50 ml trichlorofluoromethane at 25°. The reaction mixture was stirred for 2 hr, until two liquid phases formed. The solvent and fluorotrimethylsilane were distilled off under reduced pressure at 25° (0.5 mm) to give 19.59 g (92 percent) of bis(diethylamino)sulfur difluoride as a light yellow liquid: $^1$H nmr (CCl$_3$F) δ 1.36 ppm (t, J = 7.5 Hz, 12H) and 3.43 ppm (q, J = 7.5 Hz, 8H); $^{19}$F nmr (CCl$_3$F) δ +9.7 ppm (s).

Anal. Calcd for C$_8$H$_{20}$F$_2$N$_2$S: F, 17.73
Found: F, 17.92, 18.01

EXAMPLE 3

(Diethylamino)(dimethylamino)sulfur Difluoride

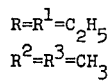

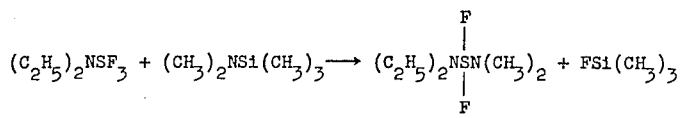

A 11.7-g (0.1 mole) sample of dimethylaminotrimethylsilane was added dropwise to a solution of 16.1 g 0.1 mole) of diethylaminosulfur trifluoride in 50 ml of trichlorofluoromethane at 25°. The reaction mixture was stirred for 1 hour. Two liquid phases formed. The solvent and fluorotrimethylsilane were removed by distillation at reduced pressure (25°, 0.5 mm) to give 17.09 g (92 percent) of (diethylamino)(dimethylamino)sulfur difluoride as a light yellow liquid: $^1$H nmr (CCl$_3$F) δ 1.35 ppm (t, J = 7.5 Hz, 6H), 2.90 ppm (s, 6H) and 3.44 ppm (q, J = 7.5 Hz, 4H); $^{19}$F nmr (CCl$_3$F) δ +10.0 ppm (s).

Anal. Calcd for C$_6$H$_{16}$F$_2$N$_2$S: F, 20.40
Found: F, 20.62, 20.71

The following table includes several new bis(dialkylamino)sulfur difluorides that are included in this invention along with an equation that illustrates their preparation.

The bis(dialkylamino)sulfur difluorides are useful as fluorinating agents. In particular, they are useful in replacing hydroxyl groups in sensitive organic compounds with fluorine atoms, and can be used in the preparation of fluorine-containing pharmaceuticals.

These difluorides are superior to other known fluorinating agents such as sulfur tetrafluoride and dialkylaminosulfur trifluoride in that they cause fewer side reactions, such as elimination of the hydroxyl group to give an olefin, and less rearrangement.

For example, reaction of crotyl alcohol with sulfur tetrafluoride gives mainly butadiene (by elimination of the hydroxyl) and reaction with diethylaminosulfur trifluoride gives mainly 2-fluorobutene (by rearrangement). However, reaction of crotyl alcohol with diethylaminodimethylaminosulfur difluoride gives the unrearranged 1-fluorobutene as the principal product. Cyclohexanol is dehydrated by both sulfur tetrafluoride and diethylaminosulfur trifluoride to give cyclohexene with only a trace of cyclohexyl fluoride being formed, but when cyclohexanol is treated with bis(dimethylamino)sulfur difluoride an appreciable yield of cyclohexyl fluoride is obtained.

The following examples illustrate the utility of bis(-dialkylamino)sulfur difluorides as fluorinating agents.

EXAMPLE A

Fluorination of Crotyl Alcohol with (Diethylamino)(dimethylamino)sulfur Difluoride

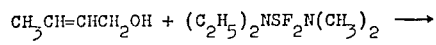

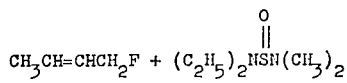

TABLE

| Dialkylaminosulfur Trifluoride | Dialkylamine trimethylsilane | Bis(dialkylamino)- sulfur Difluoride |
|---|---|---|
| (C$_2$H$_5$)$_2$NSF$_2$ |  |  |
| C$_2$H$_5$—NSF$_3$ with CH$_3$ | + CH$_3$CH$_2$CH$_2$CH$_2$—N—Si(CH$_3$)$_3$ with C$_2$H$_5$ | C$_2$H$_5$—N—SF$_2$—N—CH$_2$CH$_2$CH$_2$CH$_3$ with CH$_3$ and C$_2$H$_5$ |
| N-SF$_3$ | + N-Si(CH$_3$)$_3$ → | N-SF$_2$-N |
| N-SF$_3$ | + (CH$_3$)$_2$NSi(CH$_3$)$_3$ → | N-SF$_2$-N(CH$_3$)$_2$ |
| (n—C$_4$H$_9$)$_2$NSF$_2$ | + (n—C$_4$H$_9$)$_2$NSi(CH$_3$)$_3$ → | [(n—C$_4$H$_9$)$_2$N]$_2$SF$_2$ |
| (C$_6$H$_{13}$)$_2$NSF$_2$ | + (C$_6$H$_{13}$)$_2$NSi(CH$_3$)$_3$ → | [(C$_6$H$_{13}$)$_2$N]$_2$SF$_2$ |

A solution of 1.44 g (0.02 mole) of crotyl alcohol (2-butene-1-ol) in 2 ml diethyleneglycol dimethyl ether was slowly injected into a stirred solution of 3.7 g (0.02 mole) of (diethylamino)(dimethylamino)sulfur difluoride in 10 ml diethyleneglycol dimethyl ether cooled to −78°. The reaction mixture was warmed to 25° and the volatile products were distilled out into a cold trap at reduced pressure to give 1.3 ml of a colorless liquid. Redistillation gave 1.06 g (72 percent) of a mixture of fluorobutenes containing 79 percent 1-fluoro-2-butene and 21 percent 2-fluoro-3-butene (rearrangement product): bp 24°–27°; $^{19}$F nmr (CCl$_3$F) δ −171.6 ppm (m, 21 percent) and −210.0 ppm (m, 79 percent).

When the reaction was repeated using 2,2,4-trimethylpentane in place of diethyleneglycol dimethyl ether as the reaction solvent, a 65 percent yield of fluorobutenes was obtained consisting of 87 percent 1-fluoro-2-butene and 13 percent 2-fluoro-3-butene.

EXAMPLE B

Fluorination of Benzyl Alcohol with Bix(dimethylamino)sulfur Difluoride

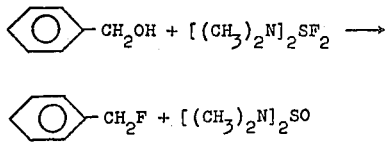

A solution of 1.08 g (0.01 mole) of benzyl alcohol in 2 ml methylene chloride was added slowly to a solution of 0.0066 mole of bis(dimethylamine)sulfur difluoride in 6 ml of methylene chloride cooled to −78°. The reaction mixture was warmed to room temperature and mixed with water. The organic layer was separated, washed with water and then 5 percent NaHCO$_3$, and dried (MgSO$_4$). Analysis by gas chromatography (g.c.) and $^{19}$F nmr showed that benzoyl fluoride had been formed in 91 percent yield.

EXAMPLE C

Fluorination of Cyclohexanol with Bis(dimethylamino)sulfur Difluoride

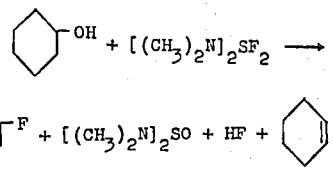

A solution of 1.0 g (0.01 mole) of cyclohexanol in 2 ml methylene chloride was slowly added to a solution of 0.0066 mole of bis(dimethylamino)sulfur difluoride in 6 ml of methylene chloride cooled to −78°. The reaction mixture was warmed to room temperature and water was added. The organic layer was separated, washed with water and dried (MgSO$_4$). Analysis by g.c. and $^{19}$F nmr showed that cyclohexene and fluorocyclohexane were formed in equal amounts; $^{19}$F nmr (CH$_2$Cl$_2$) δ −161.2 ppm (m).

The embodiments of the invention in which an exclusive property or privilege is claimed are defined as follows:

1. A compound of the formula

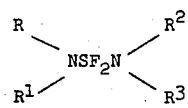

wherein R, R$^1$, R$^2$ and R$^3$, alike or different, are each a primary alkyl group of 1 to 6 carbons, or when R and R$^1$ taken together, and R$^2$ and R$^3$ taken together, are —(CH$_2$)$_4$—or —(CH$_2$)$_5$—.

2. The compound of claim 1 in which R=R$^1$=R$^2$=R$^3$=methyl; bis(dimethylamino)sulfur difluoride.

3. The compound of claim 1 in which R=R$^1$=R$^2$=R$^3$=ethyl; bis(diethylamino)sulfur difluoride.

4. The compound of claim 1 in which R=R$^1$=ethyl and R$^2$=R$^3$=methyl; (diethylamino)(dimethylamino)sulfur difluoride.

* * * * *